(12) United States Patent
Sharon et al.

(10) Patent No.: US 8,970,055 B2
(45) Date of Patent: Mar. 3, 2015

(54) SYSTEM FOR WAVE ENERGY HARVESTING EMPLOYING TRANSPORT OF STORED ENERGY

(75) Inventors: Andre Sharon, Newton, MA (US); Holger Wirz, Medford, MA (US); John C. Briggs, Lexington, MA (US); William Hartman, Jamestown, NC (US); Fritz Klocke, Aachen (DE)

(73) Assignee: Fraunhofer USA, Inc., Plymouth, MI (US)

( * ) Notice: Subject to any disclaimer, the term of this patent is extended or adjusted under 35 U.S.C. 154(b) by 0 days.

(21) Appl. No.: 13/505,367

(22) PCT Filed: Nov. 11, 2010

(86) PCT No.: PCT/US2010/056403
§ 371 (c)(1),
(2), (4) Date: Jul. 12, 2012

(87) PCT Pub. No.: WO2011/060183
PCT Pub. Date: May 19, 2011

(65) Prior Publication Data
US 2012/0267949 A1  Oct. 25, 2012

Related U.S. Application Data

(60) Provisional application No. 61/260,105, filed on Nov. 11, 2009.

(51) Int. Cl.
*F03B 13/10* (2006.01)
*F03B 13/18* (2006.01)
*B63B 35/44* (2006.01)

(52) U.S. Cl.
CPC .............. *F03B 13/1815* (2013.01); *B63B 35/44* (2013.01); *B63B 2035/4466* (2013.01); *F05B 2240/40* (2013.01); *F05B 2240/931* (2013.01); *Y02E 10/38* (2013.01)
USPC ......................................................... 290/42

(58) Field of Classification Search
USPC ......... 290/42–44, 54, 55; 307/9.1, 67; 60/495
IPC ......... B63B 2035/4466,2035/4433; F03D 9/00, F03D 9/007; Y02E 10/38, 10/76, 10/727, Y02E 70/30
See application file for complete search history.

(56) References Cited

U.S. PATENT DOCUMENTS

| 4,850,190 | A | 7/1989 | Pitts | |
|---|---|---|---|---|
| 8,193,651 | B2 * | 6/2012 | Lightfoot et al. | 290/42 |
| 2006/0162642 | A1 | 7/2006 | Morse | |
| 2008/0018114 | A1 * | 1/2008 | Weldon | 290/53 |

FOREIGN PATENT DOCUMENTS

WO   WO 2007/122376   11/2007

OTHER PUBLICATIONS

International Search Report, PCT Application No. PCT/US2010/056403, mailed Jul. 1, 2011 (3 pages).

* cited by examiner

*Primary Examiner* — Vanessa Girardi
(74) *Attorney, Agent, or Firm* — Occhiuti & Rohlicek LLP

(57) ABSTRACT

A system employs wave energy harvesting apparatus and a water vessel (e.g., a ship) carrying an energy storage apparatus (e.g., array of batteries). The energy harvesting apparatus is preferably also carried by the water vessel, but may be fixed or carried by a separate water vessel. The water vessel is operated in an energy storing mode at an energy harvesting location subject to wave activity, during which the energy storage apparatus stores energy from the wave activity as harvested by the energy harvesting apparatus. The water vessel is operated in an energy transporting mode to transport the stored energy from the energy harvesting location to an energy releasing location (preferably onshore, but may be offshore) having a connection to an electrical power grid. The water vessel is operated at the energy releasing location in an energy releasing mode in which the stored energy is transformed into appropriate AC electricity supplied to the electrical power grid.

33 Claims, 6 Drawing Sheets

SYSTEM FOR WAVE ENERGY HARVESTING EMPLOYING TRANSPORT OF STORED ENERGY

CROSS-REFERENCE TO RELATED APPLICATIONS

This application is the National Stage of International Application No. PCT/US2010/056403, filed on Nov. 11, 2010, which claims the priority of U.S. Provisional Application No. 61/260,105 filed on Nov. 11, 2009, the contents of which are incorporated herein by reference in their entirety.

BACKGROUND

The present invention is related to the field of energy, and in particular to the field of renewable energy.

The world's oceans produce an enormous amount of wave energy which could potentially provide clean, renewable, and inexpensive electric power. Furthermore, off-shore winds are substantial.

There exist a variety of design concepts for harvesting energy from ocean waves, which can be roughly arranged into several categories. Wave storage devices store energy in reservoirs, and then draw from the reservoir to produce electric power. Wave energy devices convert the energy of a wave directly into electricity, without storage. Point absorbers operate at a single point along a wave, rather than across and entire wave front. There also exist other miscellaneous wave energy concepts which are not easily categorized. Ocean current energy converters tap large-scale persistent flow patterns, including horizontal motion caused by tides. Tidal energy converters tap the vertical motion of the tides. Furthermore, wind harvesting turbines, including compact vertical axis turbines, have been demonstrated for some time.

SUMMARY

Existing approaches for harvesting energy from waves, tides, and ocean currents, as well as offshore wind, suffer from at least three significant weaknesses. Off-shore installations require the use of underwater transmission cables to carry electricity from the harvesting area to the on-shore electrical grid. These cables are very expensive to lay down and maintain. Additionally, offshore installations are susceptible to storm damage, and they produce electricity at times dictated by environmental conditions, rather than on demand when necessary. In other words, energy production cannot be scheduled to coincide with peak demand times.

Other drawbacks of existing approaches include the dependence on specific sites. Many technologies can only work in certain unusual locations, such as where the amplitude of the tide is very large, or where ocean currents are very strong. These limitations reduce the usefulness of these technologies. Permanently installed equipment also suffers the wearing effects of the harsh marine environment and sun exposure, and can create environmental and esthetic degradation.

Perhaps the greatest problem with today's ocean energy and off-shore wind technologies is their cost. Indeed, cost is the problem with almost all of today's renewable energy sources. While the government is willing to fund small demonstration projects and provide limited subsidies to encourage green technologies, it is believed that no energy source will become widely accepted unless its cost can be brought down to, or close to, the cost of fossil-fuel power.

A system is disclosed which employs wave energy harvesting apparatus and a water vessel (e.g., a ship) which carries an energy storage apparatus such as an array of batteries. The energy harvesting apparatus may also be carried by the water vessel, although in some cases it may be fixed or be carried by a separate vessel. The water vessel is operated in an energy storing mode at an energy harvesting location subject to wave activity, during which the energy storage apparatus stores energy from the wave activity as harvested by the energy harvesting apparatus. The water vessel is operated in an energy transporting mode to transport the stored energy from the energy harvesting location to an energy releasing location having a connection to an electrical power grid. The water vessel is operated at the energy releasing location in an energy releasing mode in which the stored energy is transformed into appropriate AC electricity supplied to the electrical power grid. The energy releasing location is preferably onshore, although in same cases it may be offshore.

The energy harvesting location may be a few kilometers offshore, and the energy storing mode may last for perhaps 20 hours. The stored energy may be released during a peak energy demand time. The above operation can be repeated continually, and the system may employ a number of such vessels and multiple harvesting and releasing locations. While each vessel stores and delivers a relatively modest amount of energy (e.g., 20 MWh), there can be many (e.g., thousands) of such vessels over a coastal area, collectively providing a great amount of energy into the electrical power grid at scheduled times. Thus, the disclosed technique is a modular approach that can be scaled up through replication.

The disclosed technique can offer some or all of the following advantages:
 a. No need for expensive underwater transmission cables
 b. Stored energy is available on demand during peak times
 c. Less effect on marine environment than permanent installations
 d. Vessel need not be designed to handle large storms—it can remain at port when conditions dictate
 e. High capacity achievable by modular replication
 f. Harvesting can be done at different locations as desired, for example to take advantage of greater wave activity (not tied to fixed location)
 g. May avoid many political and administrative issues that accompany the use of fixed offshore devices (e.g., siting permits)

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
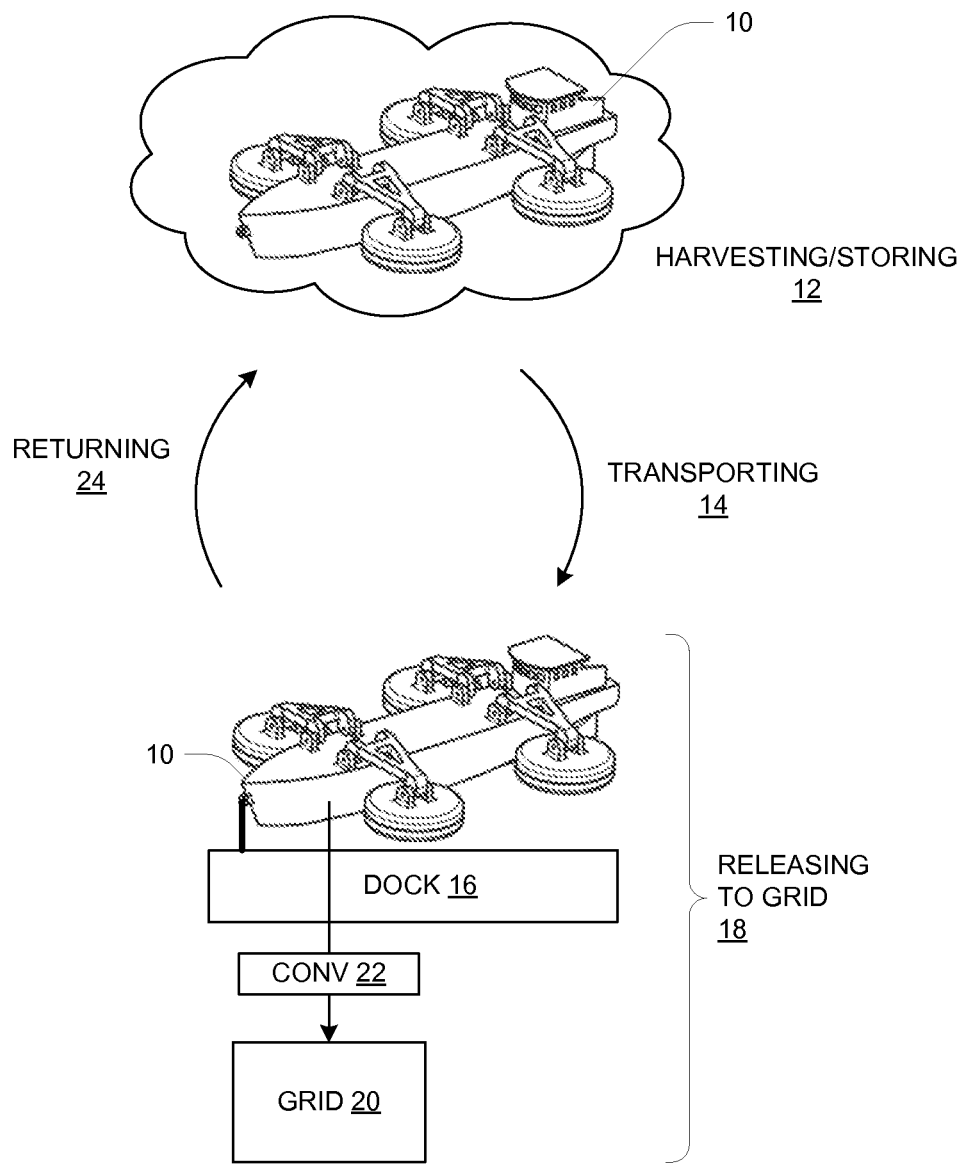
FIG. 1 is a diagram depicting wave energy harvesting operation in simplified form.

FIG. 1 depicts a cycle of wave energy harvesting by a ship, barge or similar water vessel 10. The cycle generally has four phases or modes of operating. A wave energy harvesting operation will typically involve indefinite repetitions of this cycle using one or more vessels 10 and other apparatus as more fully described below.

A harvesting/storing operating mode 12 occurs at a harvesting location on a body of water (e.g., an ocean) subject to wave activity. During the harvesting/storing mode 12, wave energy is absorbed and converted into stored energy in some form, for example as electrochemical energy in an electrical battery on the vessel 10. The vessel 10 may itself include wave energy harvesting apparatus, as more fully described below, or it may contain only storage and be coupled to a separate wave energy harvesting device which is located, either permanently or temporarily, at the harvesting location.

A transporting mode 14 involves the vessel 10 traveling (e.g., by sailing under power) to a releasing location at which the stored energy is released. The releasing location typically has some form of dock 16 or mooring to which the vessel 10 is tied for a subsequent energy releasing mode 18 of operation. The releasing location may be a port or similar onshore location, or it may be another offshore location having facilities which enable the vessel 10 to dock and perform the energy releasing operation.

During the releasing mode 18, the energy stored on the vessel 10 is used to generate electricity which is provided to an electrical grid 20 for use by electricity consumers attached to the electrical grid 20. The electrical grid 20 may range in size from a small grid serving only a local area to a larger grid having regional, national or even international extent. The releasing mode 18 typically involves use of a converter (CONV) 22 which may be permanently located at the releasing location or on the vessel 10.

Finally, in a returning mode 24 the vessel 10 returns to the harvesting location to begin another cycle of operation.

As described in more detail below, the vessel 10 in one embodiment contains a plurality of wave absorbers which collectively absorb wave energy at a relatively large rate (the time rate of energy absorption being power). For example, the vessel 10 may absorb power somewhere in the range of 0.5 to 1 MW for average typical wave conditions. The storage capacity is a function of several factors including the type of storage technology employed and its space/volume on the vessel 10. A desirable storage capacity may be on the order of 20 MWh for example. The duration of wave energy harvesting in the harvesting/storing mode 12 will be dictated in part by the ratio of power input and storage capacity. For example, if energy is being harvested at a rate of 1 MW, it will take about 20 hours to completely charge a 20-MWh store.

From an operational efficiency perspective, it is generally desirable that the operating cycle depicted in FIG. 1 be as short as possible. However, one beneficial feature of the technique is the temporary storage of the energy on the vessel 10, which means that the releasing operation 18 can be scheduled to coincide with periods of high demand if desired. To accommodate flexible scheduling, it may be necessary to employ a somewhat longer overall average cycle time with some amount of "dead" time during which the vessel 10 may be docked but not generating electricity for the grid 20.

An energy delivery system will generally include multiple vessels 10, perhaps distributed over a wide stretch of coastline to provide significant amounts of electricity. In such a scaled-up system, there can be sharing of resources for optimum economics. As an example, a converter 22 may be located at the releasing location and used by a number of vessels in the course of an operating period. Likewise, in the case that the vessels 10 connect to separate harvesters in the harvesting/storing mode 12 (more related description below), it may be desirable that multiple vessels 10 utilize a given harvester. Additionally, in this case a given harvester may be permanently fixed at a given location, or it may be carried by a separate vessel so that it can be moved among different locations. More broadly, if an overall system has numerous harvesters, vessels 10 and converters 22, then it exhibits attributes of higher overall capacity and modularity.

As mentioned, the vessel 10 may be any of several types including both self-powered types (e.g., a conventional boat or ship) and non-powered types (e.g. a barge). A self-powered vessel 10 can be driven under its own power during the transporting mode 14, whereas an unpowered vessel 10 requires coupling to a separate powered vessel (e.g., tugboat) which can tow/push the vessel 10 during the transporting mode 14.

Figure 2:
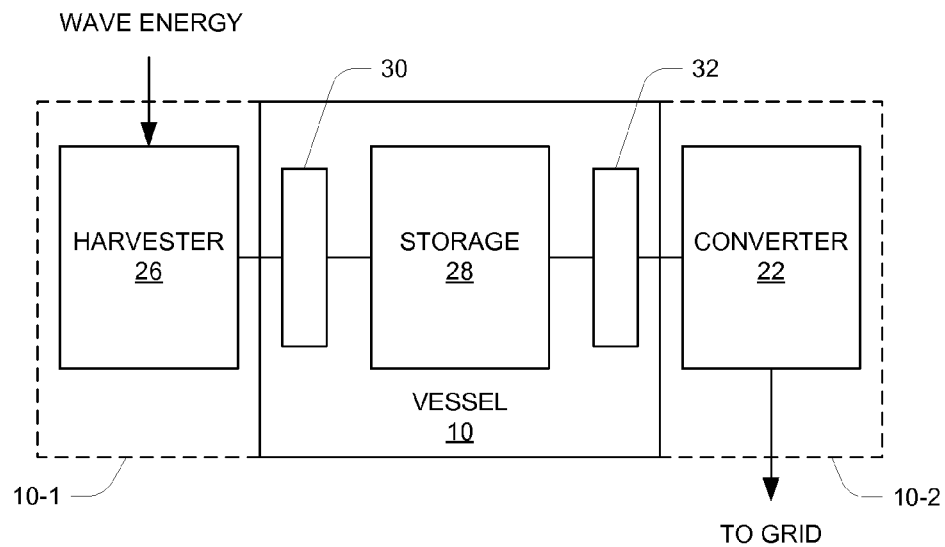
FIG. 2 is a block diagram of a wave energy harvesting system.

FIG. 2 is a high-level system block diagram showing equipment used in operation. A wave harvester 26 is subjected to wave energy and converts the wave energy into some other form, for example another mechanical form. The energy output from the harvester 26 is provided to a storage component 28 which is capable of storing energy in a chosen suitable form. The stored energy is provided to the converter 22 for transformation into AC electrical power which is provided to the electrical power grid. The system also includes the vessel 10 which carries at least the storage component 28, in order to transport the stored energy between the harvesting location and the releasing location. As indicated by the dotted lines 10-1 and 10-2, the vessel 10 may include either or both the harvester 26 and converter 22. Also, the system will generally include respective converter components 30, 32 that effect appropriate conversions of the form of energy between the harvester 26 and storage 28 and between the storage 28 and converter 22. The converters 30, 32 may or may not be located on the vessel 10 with the storage 28.

One specific configuration of the general system of FIG. 2 is as follows. The harvester 26 includes one or more buoys and respective linkages which convert wave motion into mechanical motion on the vessel 10, which may include for example the moving of hydraulic fluid in a pressurized hydraulic system. The converter 30 includes an electrical generator (such as a hydraulically actuated generator) which uses the mechanical motion from the harvesters 26 to generate DC electricity. An alternative design would directly connect the buoy motion to an electrical generator without the intermediate hydraulic step. The storage component 28 is a large array of electrochemical batteries which are charged by the electricity from the converter 30. The converter 32 is not required, as the converter 22 performs the function of an inverter which generates AC electricity for the grid directly from the DC electricity which is supplied to it from the storage component 28.

Figure 3:
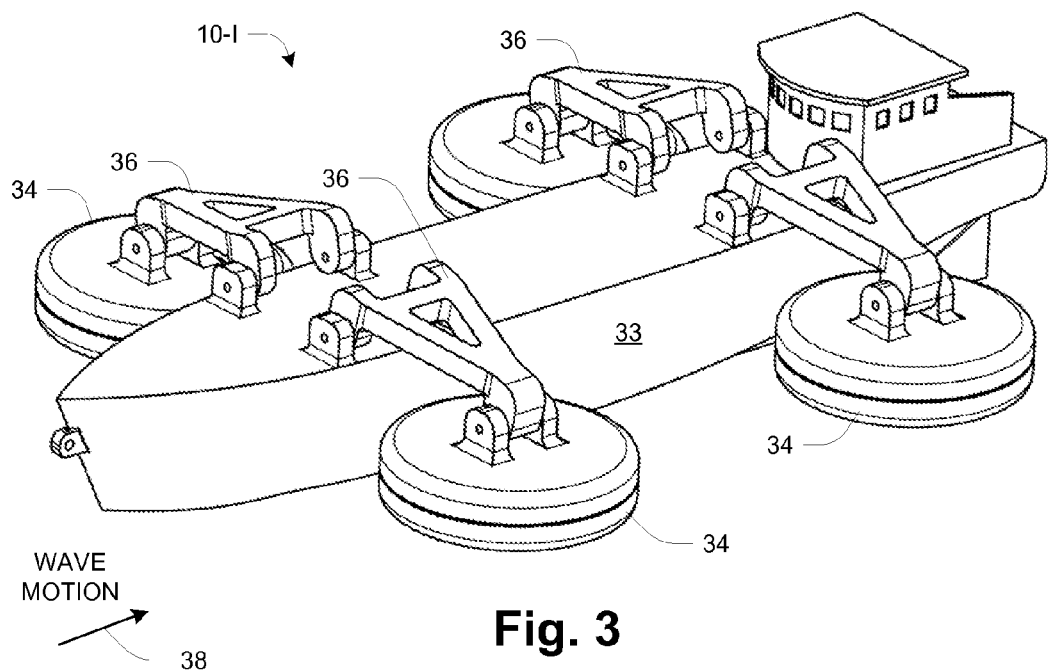
FIG. 3 is a perspective view of a wave energy harvesting water vessel employing heaving buoys, shown in deployed positions during a harvesting mode of operation.

FIG. 3 shows a first embodiment of a vessel 10-I. This is a self-powered vessel which may be referred to as a boat or ship, capable of traveling on the surface of a body of water under its own power. The vessel 10-I includes what is referred to herein as a "vessel body" 33 which is the structure such as hull, deck, etc., as well as wave energy harvesting apparatus carried by the vessel body 33. The wave energy harvesting apparatus includes so-called "heaving" buoys 34 which float in the water and rise and fall with wave action, as well as mechanical linkages 36 which connect the buoys 34 to the vessel body 33. In the simplified depiction of FIG. 3 (as well as FIG. 6 described below), the buoys 34 are shown as relatively flat objects which ride primarily on the surface, but it is anticipated that in practice more traditional buoys which are weighted and more fully submerged may be employed. That is, the technique contemplates the use of either shallow-draft as well as deep-draft buoys.

In FIG. 3 an arrow 38 indicates the direction of predominant wave travel. The vessel 10-I will be anchored or otherwise moored at the harvesting location. Heaving (up and down) motion of the buoys 34 is translated by the linkages 36 to corresponding mechanical motion on the vessel body 33, which motion is then converted as necessary into a form for storage by the storage component 28 (not shown in FIG. 3) carried by the vessel body 33.

It should also be noted that a buoy system can be designed in such a way that the buoys are mostly stationary while the ship moves in the waves. This method can generate energy just as well as having the ship be stationary and the buoys moving.

Figure 4:
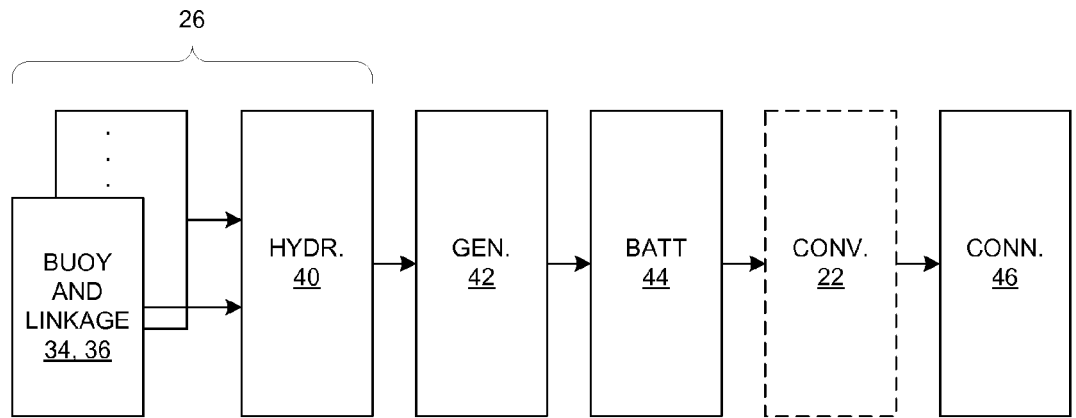
FIG. 4 is a schematic diagram of a wave energy harvesting water vessel.

FIG. 4 shows a schematic diagram of the important functional components of a vessel 10 such as vessel 10-I. The buoys and linkages 34, 36 provide mechanical motion to a hydraulic system (HYDR) 40, which in turn provides hydraulic pressure to a hydraulically actuated generator (GEN) 42 that generates DC electricity which is stored in a battery array (BATT) 44. The buoys and linkages 34, 36 and hydraulic system 40 constitute an example of the wave energy harvester 26 of FIG. 2. Additionally, the hydraulic system 40 and generator 42 are an example of converter 30 of FIG. 2, and the battery array 44 is an example of the storage component 28 of FIG. 2. Connection circuitry (CONN) 46 provides a connection from the battery array 44 to off-ship equipment and ultimately to the electrical grid 20, possibly through the use of an onboard converter 22 (shown in dotted line to indicate its optional on-board nature).

Figure 5:
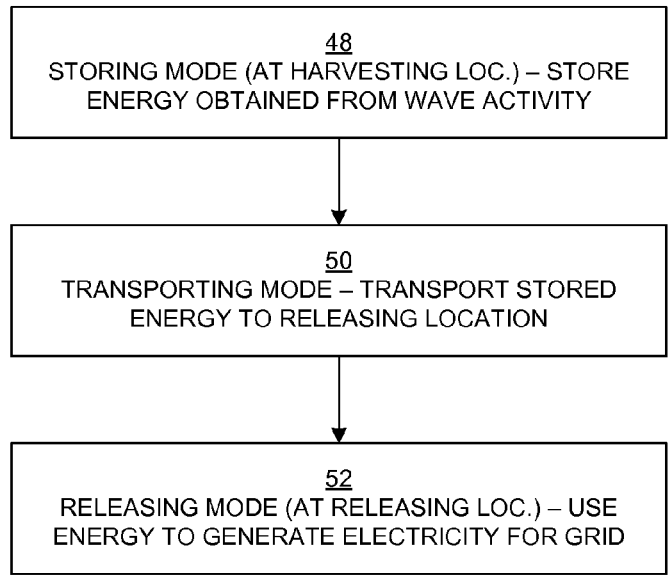
FIG. 5 is a flow diagram for a cycle of wave energy harvesting operation.

FIG. 5 illustrates operation in the form of a flow chart. At 48 is an energy storing operation performed at the harvesting location, in which energy from wave activity (obtained via the wave energy harvester 26) is stored in the storage component 28. At 50 the stored energy is transported to the releasing location. At 52 is an energy releasing operation performed at the releasing location, in which the stored energy is used to generate electricity which is provided to the electrical grid 20. It will be appreciated that the steps 48, 50 and 52 correspond to the actions 12, 14 and 18 described above with reference to FIG. 1.

Figure 6:
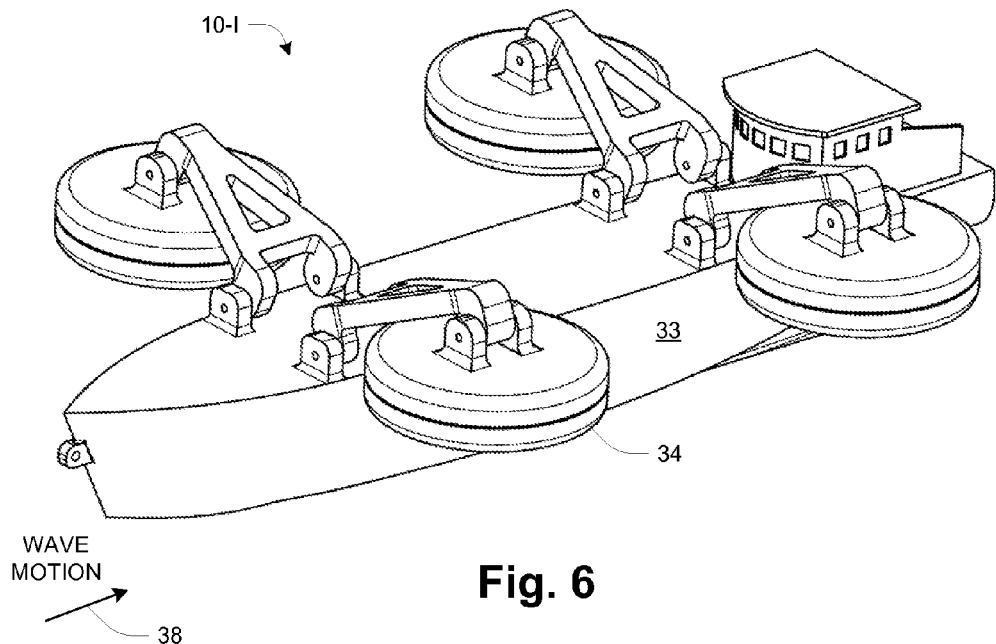
FIG. 6 is a perspective view of a wave energy harvesting water vessel employing heaving buoys, shown in retracted positions for transport.

FIG. 6 shows the vessel 10-I with the buoys 34 in a raised or retracted position in which they are not in contact with the water. Some form of retraction of the buoys 34 is desirable when the vessel 10 is traveling, as in their non-retracted or deployed position (FIG. 3) they may unduly interfere with proper sailing of the vessel 10-I. In the simplified example of FIG. 6 this retraction is illustrated by raising the buoys 34 vertically, but other types of retraction are possible. For example, the buoys may be drawn inward to the vessel body 33 and secured there, and/or they may be turned slightly inwardly or aftward in order to reduce drag when sailing. Other forms of retraction are possible.

Figure 7:
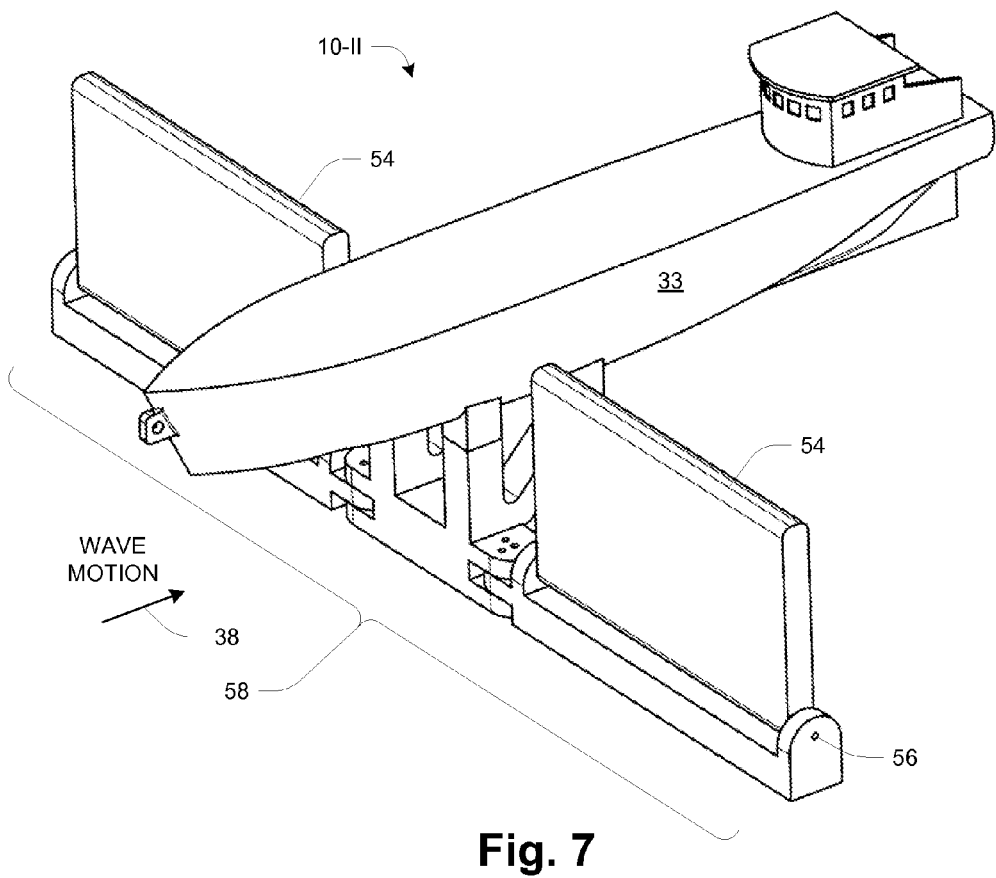
FIG. 7 is a perspective view of a wave energy harvesting water vessel employing pitch/surge buoys, shown in deployed positions during a harvesting mode of operation.
Figure 8:
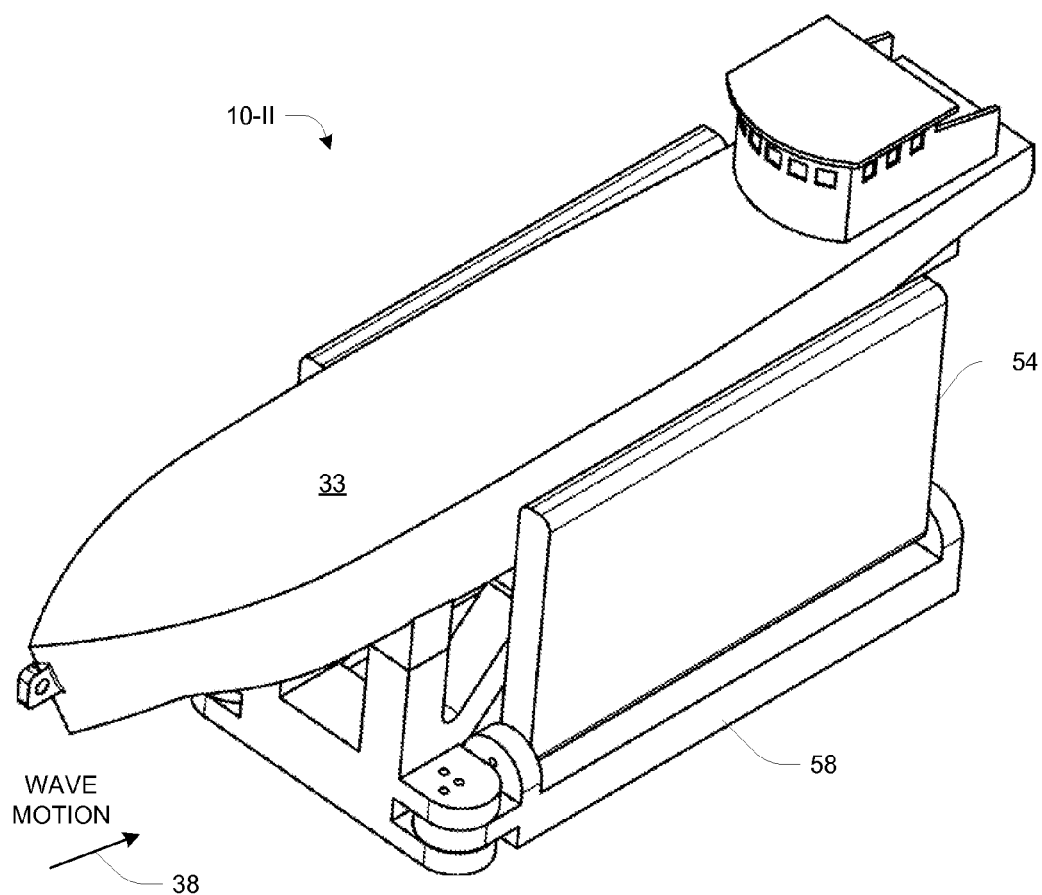
FIG. 8 is a perspective view of the wave energy harvesting water vessel of FIG. 7, with the pitch/surge buoys shown in retracted positions for transport.

FIGS. 7 and 8 illustrate an alternative embodiment (shown as vessel 10-II) which employs pitch/surge buoys 54. Each pitch/surge buoy 54 rotates over a small range of angles about a respective fixed transverse pivot line 56 on a support structure 58 located beneath the surface. The mechanical motion is transferred to the vessel body 33 by appropriate linkages and/or other elements (not shown in FIGS. 7 and 8). FIG. 7 shows the pitch/surge buoys 54 in deployed operational positions, and FIG. 8 shows them in retracted positions for travel.

Figure 9:
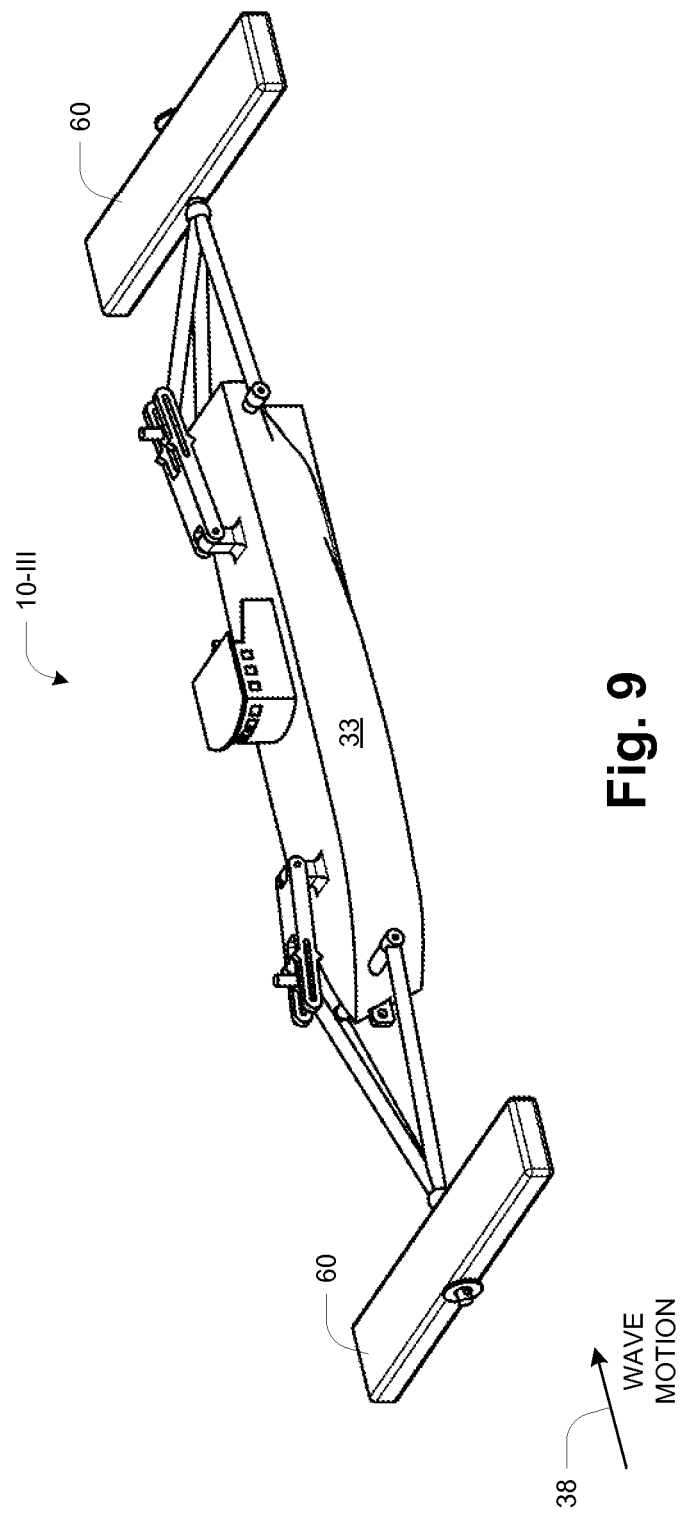
FIG. 9 is a perspective view of a second wave energy harvesting water vessel employing heaving buoys.

FIG. 9 shows an alternative embodiment (shown as vessel 10-III) in which buoys 60 extend longitudinally from the vessel body 33, making for an overall longer structure. This arrangement may be beneficial especially in areas which experience longer wave lengths. Referring back to FIG. 3, it will be appreciated that the configuration may generally be most useful when the wave length is less than the length of the vessel body 33, so that the vessel body 33 remains relatively stationary in the water while the buoys 34 heave up and down relative to the vessel body 33. This arrangement can become less effective at longer wavelengths, because in such conditions the vessel body 33 tends to just ride up and down along with the buoys 34 and thus experience no relative motion. The arrangement of FIG. 9 may be more suitable in such a long-wavelength operating environment, because the vessel body 33 will tend to rotate slightly about its short axis (i.e., to rock lengthwise) and thus experience the necessary relative motion between its ends (bow and stern) and the respective buoys 60.

It should be noted that the above relationships regarding configurations and different wavelengths may change somewhat if the buoys are designed to be relatively stationary in the water, e.g. deep draft. Then a configuration like that of FIG. 3 may work well even with longer wavelengths.

As a concrete example of the above, if it is assumed that the vessel body 33 is approximately 46 meters in length, then an arrangement like that of FIG. 3 may be suitable for wavelengths of less than 46 meters, whereas for longer wavelengths the arrangement of FIG. 9 may be more suitable.

While various embodiments of the invention have been particularly shown and described, it will be understood by those skilled in the art that various changes in form and details may be made therein without departing from the spirit and scope of the invention as defined by the appended claims.

For example, technologies other than batteries can be used in the energy storage component 28. Alternatives include mechanical flywheels, compressed gas, capacitors, gravity, springs, and thermal storage. Depending on the nature of the storage technology, specific corresponding converters 22, 30, and 32 may be employed. For example, in the case of thermal storage the converter 32 may employ a generator driven by a steam turbine, and in the case of compressed-air storage the converter 32 may employ a generator driven by a compressed gas engine.

For operational flexibility it may be desirable that the configuration of the buoys 34 be controllable or "tunable" by operating personnel to maximize harvesting efficiency depending on wave conditions. Two types of tuning are envisioned, 1) spatial position of the buoys, and 2) natural frequency of the buoys. As an example of spatial position tuning, the linkages 36 may be connected to a horizontal support rod capable of telescoping to vary the overall longitudinal span of the buoys 34, and this capability can be used to obtain an optimum spacing depending on the wavelengths experienced in operation. As an example of natural frequency tuning, additional water could be added to the buoys to increase their mass and lower their natural frequencies.

Additionally, it may be desirable to include wind turbines on the vessel 10 to enable the vessel 10 to harvest wind energy along with wave energy. Mechanical energy from the wind turbines would be converted into appropriate form for the storage component 28. It is expected that so-called vertical axis wind turbines might be better candidates than traditional horizontal-axis wind turbines.

It is contemplated that a vessel used for energy transporting may include energy storage apparatus having an energy storage capacity of at least 1 MWh.

Additionally, it is contemplated that a vessel may be used not for transporting energy but for using harvested energy for its own purposes (e.g., on-board electrical loads).

What is claimed is:

1. A water vessel for wave energy harvesting, comprising:
    a floating vessel body;
    a wave harvesting apparatus including a plurality of buoys, each buoy independently coupled to the floating vessel body; and
    energy storage apparatus carried by the floating vessel body, energy storage apparatus having an energy storage capacity of at least 1 MWh and being configured to (1) receive and store energy provided by the wave energy harvesting apparatus during an energy storing operation, and (2) provide the stored energy in an energy releasing mode for use in generating appropriate AC electricity supplied to an electrical power grid
    wherein each buoy of the plurality of buoys moves independently of all other buoys of the plurality of buoys.

2. A water vessel according to claim 1, wherein the energy storage apparatus employs an array of batteries.

3. A water vessel for wave energy harvesting, comprising:
    a floating vessel body configured for use in repeated operating cycles each including an energy storing mode, an energy transporting mode and an energy releasing mode, the energy storing mode including operation on a body of water at an energy harvesting location subject to wave activity, the energy transporting mode including movement of the water vessel from the energy harvesting location to an energy releasing location having a connection to an electrical power grid; and
    a wave energy harvesting apparatus including a plurality of buoys, each buoy independently coupled to the floating vessel body and an energy storage apparatus carried by the floating vessel body, the wave energy harvesting apparatus and energy storage apparatus being cooperative in the energy storing mode to harvest and store energy from the wave activity, the energy storage apparatus being further operative at the energy releasing location in an energy releasing mode in which the stored energy is transformed into appropriate AC electricity supplied to the electrical power grid
    wherein each buoy of the plurality of buoys moves independently of all other buoys of the plurality of buoys.

4. A water vessel according to claim 3, wherein the wave energy harvesting apparatus includes pitch/surge buoys and a support structure coupling the pitch/surge buoys to the vessel body, the pitch/surge buoys being oriented in a direction generally transverse to a direction of wave travel during the energy storing mode.

5. A water vessel according to claim 3, wherein the wave energy harvesting apparatus includes retraction apparatus operative to retract the buoys into retracted positions during the energy transporting mode.

6. A water vessel according to claim 3, wherein the wave energy harvesting apparatus has a variable mechanical configuration which may be tuned to different wave conditions experienced during the energy storing mode.

7. A water vessel according to claim 3, further including wind energy harvesting apparatus operative in the energy storing mode to absorb energy from wind activity which is stored by the energy storage apparatus.

8. A water vessel according to claim 3, further comprising a drive train by which the water vessel is self-powered, the drive train being operative in the energy transporting mode to drive the water vessel under its own power.

9. A water vessel according to claim 3, configured to be coupled to a separate powered water vessel which is driven under its own power to move the water vessel during the energy transporting mode.

10. A water vessel according to claim 3, configured to be coupled to a separate wave energy harvesting apparatus operative in the energy storing mode to absorb the energy from the wave activity and provide the absorbed energy to the water vessel for storing in the energy storage apparatus.

11. A water vessel according to claim 3, wherein the energy storage apparatus includes an array of batteries and a generator for producing electricity from a mechanical input produced by the wave activity, the electricity from the generator being supplied to the batteries during the energy storing mode.

12. A water vessel according to claim 11, further including an inverter by which the stored energy is transformed into the appropriate AC electricity supplied to the electrical power grid.

13. A water vessel according to claim 3, wherein the energy storage apparatus employs a storage technology selected from mechanical flywheels, compressed gas, capacitors, gravity, springs, and thermal storage.

14. A water vessel according to claim 13, further including a converter of a type corresponding to the storage technology by which the stored energy is transformed into the appropriate AC electricity supplied to the electrical power grid.

15. A water vessel according to claim 3, wherein the wave energy harvesting apparatus includes heaving buoys and respective linkages coupling the heaving buoys to the vessel body.

16. A water vessel according to claim 15, wherein the vessel body is generally elongated and the heaving buoys are located at respective sides thereof with the linkages extending in a direction generally transverse to a long axis of the vessel body.

17. A water vessel according to claim 15, wherein the vessel body is generally elongated and the heaving buoys are located at respective ends thereof with the linkages extending in a direction generally parallel to a long axis of the vessel body.

18. A method of harvesting wave energy, comprising:
    forming a wave harvesting apparatus on a water vessel including independently coupling each buoy of a plurality of buoys to a water vessel body of the water vessel, thereby facilitating independent movement of each buoy relative to all other buoys of the plurality of buoys;
    operating the water vessel in an energy storing mode at an energy harvesting location subject to wave activity, the water vessel including energy storage apparatus operative in the energy storing mode to store energy from the wave activity;

operating the water vessel in an energy transporting mode to transport the stored energy from the energy harvesting location to an energy releasing location having a connection to an electrical power grid; and operating the water vessel at the energy releasing location in an energy releasing mode in which the stored energy is transformed into appropriate AC electricity supplied to the electrical power grid, wherein the wave energy harvesting apparatus is operative in the energy storing mode to absorb the energy from the wave activity which is stored by the energy storage apparatus.

19. A method according to claim 18, wherein the buoys are retractable and are placed in the water during the energy storing mode, and further comprising retracting the buoys into retracted positions during the energy transporting mode.

20. A method according to claim 18, wherein the wave energy harvesting apparatus has a variable mechanical configuration which may be tuned to different wave conditions, and further comprising tuning the mechanical configuration of the wave energy harvesting apparatus to wave conditions experienced during the energy storing mode.

21. A method according to claim 18, wherein the water vessel further includes wind energy harvesting apparatus operative in the energy storing mode to absorb energy from wind activity which is stored by the energy storage apparatus.

22. A method according to claim 18, wherein the energy releasing location is an onshore location.

23. A method according to claim 18, wherein the water vessel is self-powered, and wherein operating the water vessel in the energy transporting mode includes driving the water vessel under its own power.

24. A method according to claim 18, wherein the water vessel is not self-powered, and wherein operating the water vessel in the energy transporting mode includes coupling the water vessel to a powered water vessel which is driven under its own power.

25. The method of claim 18 wherein the water vessel is untethered to the energy releasing location.

26. The method of claim 18 wherein independently coupling each buoy of the plurality of buoys to the water vessel body of the water vessel includes coupling each buoy of the plurality of buoys only to the water vessel body.

27. A method according to claim 18, wherein the energy storage apparatus employs an array of batteries and a generator for producing electricity from a mechanical input produced by the wave activity, the electricity from the generator being supplied to the batteries during the energy storing mode.

28. A method according to claim 27, wherein the stored energy is transformed into the appropriate AC electricity by operation of an inverter.

29. A method according to claim 18, wherein the energy storage apparatus employs a storage technology selected from mechanical flywheels, compressed gas, capacitors, gravity, springs, and thermal storage.

30. A method according to claim 29, wherein the stored energy is transformed into the appropriate AC electricity by operation of a converter of a type corresponding to the storage technology.

31. A method according to claim 18, wherein operating the water vessel in the energy storing mode includes coupling the water vessel to a separate wave energy harvesting apparatus operative in the energy storing mode to absorb the energy from the wave activity and provide the absorbed energy to the water vessel for storing in energy storage apparatus.

32. A method according to claim 31, wherein the separate wave energy harvesting apparatus is fixed at the harvesting location.

33. A method according to claim 31, wherein the separate wave energy harvesting apparatus is carried by a second water vessel which is brought to the harvesting location.

* * * * *